United States Patent
Smith

(10) Patent No.: US 11,763,002 B2
(45) Date of Patent: Sep. 19, 2023

(54) PHYSICAL EDGE COMPUTING ORCHESTRATION USING VOUCHERS AND A ROOT OF TRUST

(71) Applicant: Intel Corporation, Santa Clara, CA (US)

(72) Inventor: Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 239 days.

(21) Appl. No.: 16/913,946

(22) Filed: Jun. 26, 2020

(65) Prior Publication Data

US 2020/0327231 A1 Oct. 15, 2020

Related U.S. Application Data

(60) Provisional application No. 62/868,873, filed on Jun. 29, 2019.

(51) Int. Cl.
  *G06F 21/57* (2013.01)
  *G06F 21/33* (2013.01)
  *G06F 21/62* (2013.01)

(52) U.S. Cl.
  CPC .............. *G06F 21/57* (2013.01); *G06F 21/33* (2013.01); *G06F 21/62* (2013.01); *G06F 2221/034* (2013.01)

(58) Field of Classification Search
  CPC .......... G06F 21/33; G06F 21/57; G06F 21/62; G06F 21/74; G06F 2221/034
  See application file for complete search history.

(56) References Cited

U.S. PATENT DOCUMENTS

| | | | |
|---|---|---|---|
| 2008/0109322 A1* | 5/2008 | Leach ................ | G06Q 30/0641 705/27.1 |
| 2013/0036476 A1* | 2/2013 | Roever .................. | H04L 63/08 726/27 |

(Continued)

OTHER PUBLICATIONS

"A Voucher Artifact for Bootstrapping Protocols"—Watsen et al, Internet Engineering Task Force, May 2018 https://datatracker.ietf.org/doc/rfc8366/ (Year: 2018).*

(Continued)

*Primary Examiner* — Randy A Scott
(74) *Attorney, Agent, or Firm* — Schwegman Lundberg & Woessner, P.A.

(57) ABSTRACT

Systems and methods for implementing a voucher to identify ownership rights of a computing component, within robust supply chain and owner domains, are disclosed. In an example, a computing device configuration includes a hardware component, trusted hardware circuitry to provide an embedded voucher for the hardware component, and storage memory to provide a voucher for validation of the hardware component. The embedded voucher includes an identifier for the hardware component and the identifier is generated on behalf of an original entity authorized to issue the identifier. The voucher includes a second identifier provided on behalf of a subsequent entity and the second identifier is generated based on the identifier for the hardware component included in the embedded voucher. The voucher may be used to the identify ownership rights in the hardware component for the original entity and the subsequent entity, to enable subsequent actions (such as onboarding, updates, etc.)

18 Claims, 13 Drawing Sheets

(56) References Cited

U.S. PATENT DOCUMENTS

| | | | | |
|---|---|---|---|---|
| 2015/0220891 A1* | 8/2015 | Karlsson | ............. | G06Q 20/045 |
| | | | | 705/71 |
| 2017/0046806 A1* | 2/2017 | Haldenby | ............. | G06Q 40/08 |
| 2019/0042779 A1* | 2/2019 | Agerstam | ............. | G06F 21/554 |

OTHER PUBLICATIONS

"Hardware Requirements for a Device Identifier Composition Engine"—TCG, Mar. 22, 2018 https://trustedcomputinggroup.org/resource/hardware-requirements-for-a-device-identifier-composition-engine/ (Year: 2018).*

"Hardware Requirements for a Device Identifier Composition Engine", Family 2.0Level 00 Revision 78, (Mar. 22, 2018), 12 pgs.

"Automated IoT device provisioning in seconds", (2019), 4 pgs.

Moyer, Bryon, "A Roll of the DICE More Robust IoT Gadgetry", (Sep. 4, 2018), 10 pgs.

Watsen, K, "A Voucher Artifact for Bootstrapping Protocols", Internet Engineering Task Force (IETF), (May 2018), 23 pgs.

Watsen, K, "Secure Zero Touch Provisioning (SZTP)", Internet Engineering Task Force (IETF), (Apr. 2019), 88 pgs.

* cited by examiner

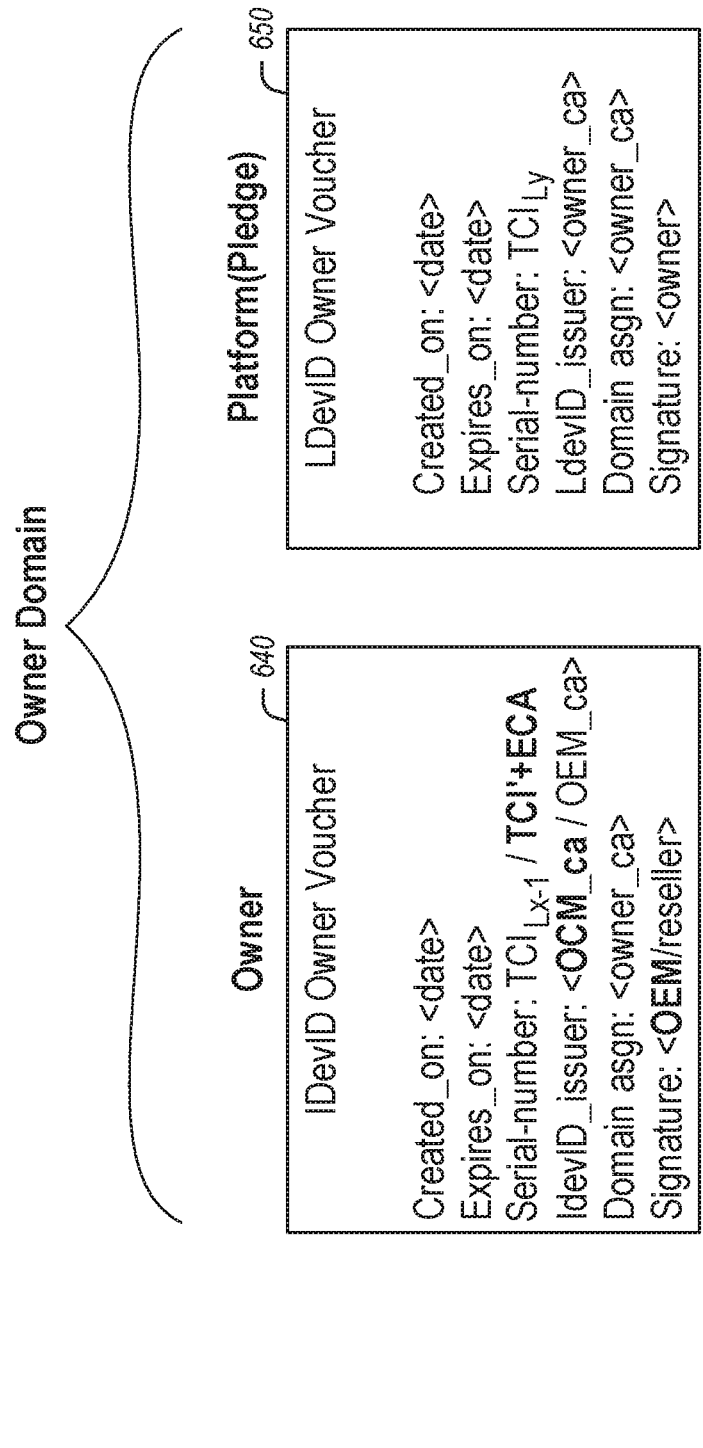

US 11,763,002 B2

PHYSICAL EDGE COMPUTING ORCHESTRATION USING VOUCHERS AND A ROOT OF TRUST

PRIORITY APPLICATION

This application claims priority to U.S. Provisional Application Ser. No. 62/868,873, filed Jun. 29, 2019, which is incorporated herein by reference in its entirety.

TECHNICAL FIELD

Embodiments described herein generally relate to security and processing techniques used with data communications and interconnected device networks, and in particular, to security and processing techniques applied within computing devices such as internet of things (IoT) and edge computing devices and device networks based on vouchers.

BACKGROUND

IoT devices are physical or virtual objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF). Further standards that specify security requirements and approaches for IoT and distributed device settings are also being proposed by the Trusted Computing Group (TCG).

Edge computing, at a general level, refers to the movement of computing and resources closer to the edge of the network. The purpose of this movement is to optimize total cost of ownership, reduce application latency, improve service capabilities, and improve compliance with security or data privacy requirements (especially as compared to conventional cloud computing). Applications that have been adapted for edge computing include but are not limited to virtualization of traditional network functions (e.g., to operate telecommunications services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, among many other network and compute intensive services.

Edge computing may, in some scenarios, offer or host a cloud-like distributed service, to offer orchestration and management for applications and coordinated service instances among many types of storage and compute resources. Edge computing may be further integrated with use cases and technology developed for IoT and Fog networking configurations, as endpoint devices, clients, and gateways attempt to access network resources and applications at locations moved closer to the edge of the network. Many considerations of security, access, and operation become far more important as these additional use cases and services are introduced in complex scenarios.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 6A and 6B illustrates a progressive arrangement of embedded and digital vouchers implementing a supply chain onboarding use case, according to an example;

DETAILED DESCRIPTION

Figure 1:
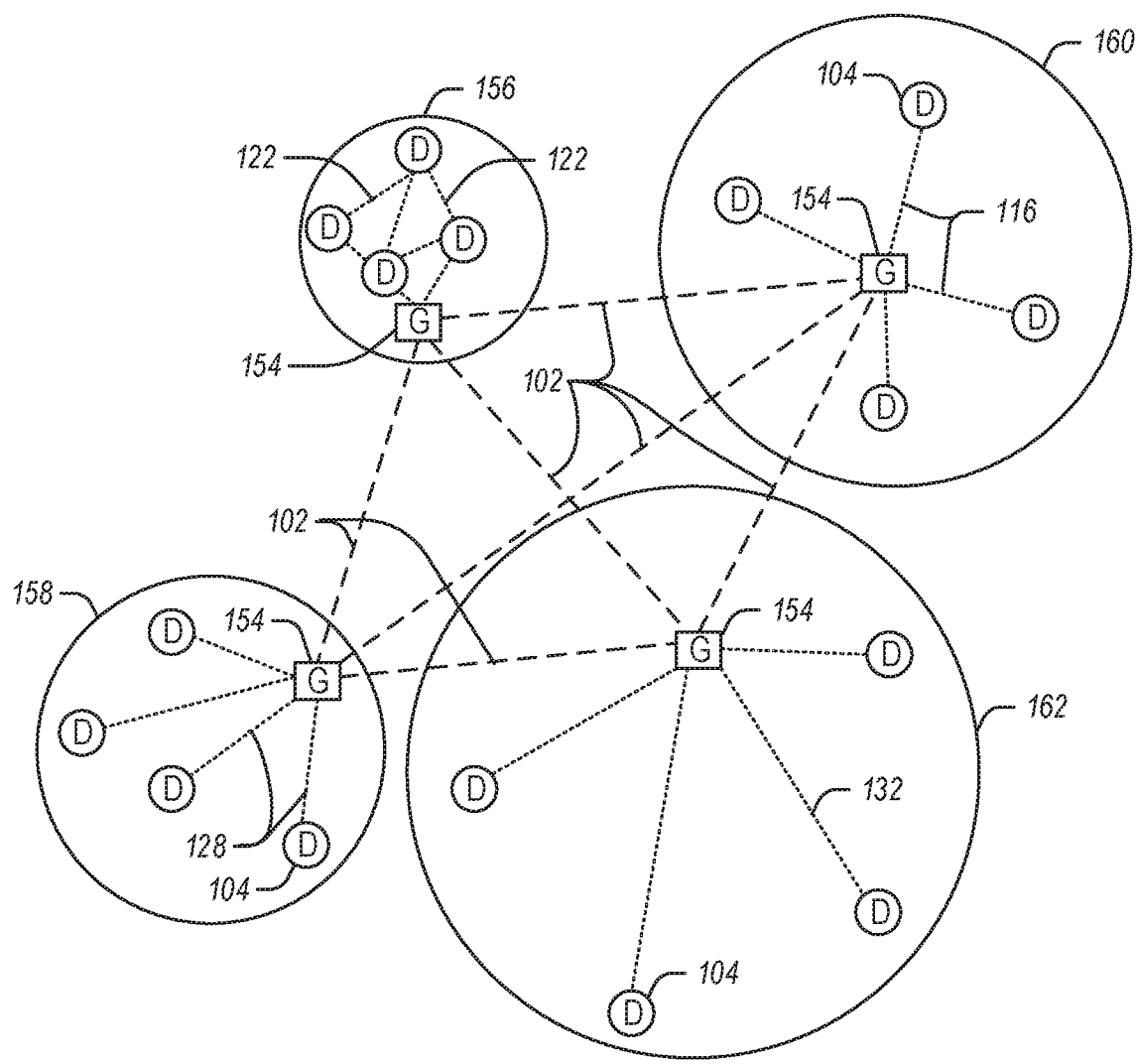
FIG. 1 illustrates a domain topology for respective internet-of-things (IoT) networks coupled through links to respective gateways, according to an example.

In the following description, methods, configurations, and related apparatuses are disclosed for the orchestration and processing of security contexts, including in a distributed or complex computing device interconnection setting involving various Edge and IoT computing devices. These security contexts are enabled through the use of various hardware components that provide a root of trust (RoT), such as those which implement security approaches enabled by a Trusted Computing Group (TCG) Device Identifier Composition Engine (DICE) implementation. Such security contexts may involve security operations performed among multiple layers of hardware in a distributed trusted computing base (TCB) architecture.

Specifically, the following includes techniques for embedding vouchers into a hardware RoT, as the hardware RoT retains partial ownership of a component which needs a manufacturer update. The component may refer to the voucher to verify a 're-onboarding' step performed by a supply chain entity. This 're-onboarding' step may be performed after a prior ownership transfer and onboarding of the platform by a new owner (such as an edge service provider). Thus, the use of vouchers enables trusted operations to be performed and authenticated back to the original source of the component, even after the ownership of the device has been transferred to other entities.

The following approaches enable original component manufacturers (OCMs) greater flexibility toward continuous, zero-touch, platform/component lifecycle management. These approaches are also highly trustworthy because the component will verify that the OCM is authorized to perform the update, cause retooling, or other actions. Likewise, the component may, using a TCG Device Identity Composition Engine (DICE) hardware root of trust mechanism, present component credentials to the manufacturer or edge ecosystem entity for verification. This verification may ensure that the partially-owned platform or component is the correct or intended target for the update or retooling.

The techniques discussed herein refer to multiple layers of hardware and trusted computing architectures. These multiple layers may be implemented among architectures which establish trust in hardware components such as Intel Software Guard Extensions (SGX), ARM TrustZone, Co-processors, or other types of devices and components. As a result, the following techniques and configurations may be applicable to a variety of hardware implementations, including with constrained Edge and IoT computing devices.

Additionally, the techniques discussed herein are applicable for configurations provided according to the Device Identity Composition Engine (DICE) specifications provided by the Trusted Computing Group (TCG) standards group. The TCG has defined DICE as a trusted hardware building block for generating cryptographic device identities and attestation using the identities. In an example, the trusted hardware implementing DICE is the first layer of a layered TCB architecture. Subsequent TCB layers can be dynamically added or removed to fallback to a trusted state. TCB layers may be added during manufacturing and later at or during deployment. The Layered TCB approach, referenced herein, seeks to identify and use the most essential trusted computing components implementable in hardware and whose implementation is verifiably correct. A layered TCG may be used for generating, distributing, and verifying the vouchers discussed herein.

Examples of IoT and Edge Computing Devices

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
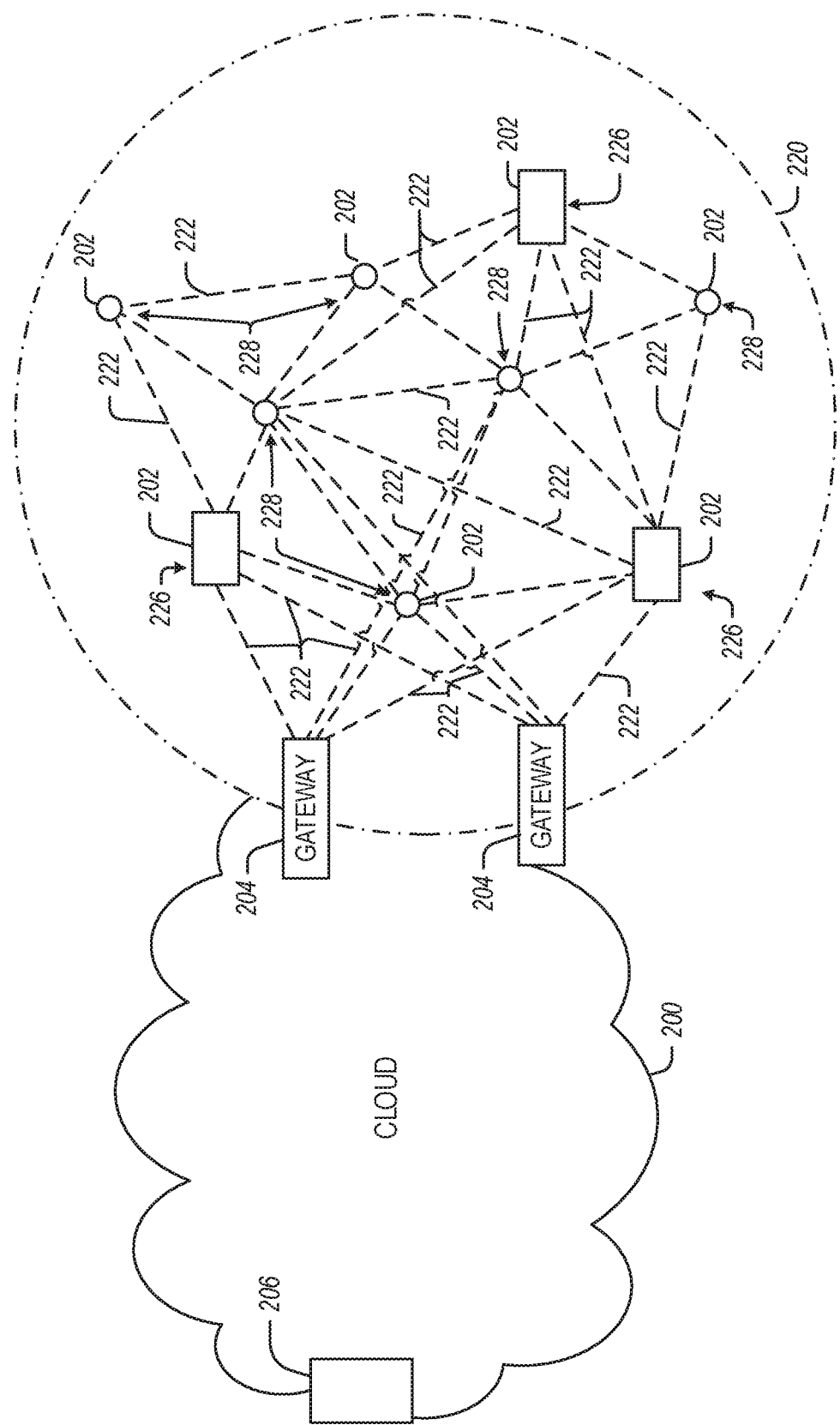
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into "fog" devices or integrated into "edge" computing systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 3 and 4.

Finally, clusters of IoT devices may be equipped to communicate with other IoT devices as well as with a cloud network. This may allow the IoT devices to form an ad-hoc network between the devices, allowing them to function as a single device, which may be termed a fog device, fog platform, or fog network. This configuration is discussed further with respect to FIG. 2 below.

FIG. 2 illustrates a cloud computing network in communication with a mesh network of IoT devices (devices 202) operating as a fog platform in a networked scenario. The mesh network of IoT devices may be termed a fog network 220, established from a network of devices operating at the edge of the cloud 200. To simplify the diagram, not every IoT device 202 is labeled.

The fog network 220 may be considered to be a massively interconnected network wherein a number of IoT devices 202 are in communications with each other, for example, by radio links 222. The fog network 220 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 220 may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog network 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog network 220 provided from these IoT devices 202 may be presented to devices in the cloud 200, such as a server 206, as a single device located at the edge of the cloud 200, e.g., a fog network operating as a device or platform. In this example, the alerts coming from the fog platform may be sent without being identified as coming from a specific IoT device 202 within the fog network 220. In this fashion, the fog network 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog platform may be configured in a declarative programming style, enabling the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog network 220 device the IoT devices 202, such as particular sensors 228, needed to answer the query. The data from these sensors 228 may then be aggregated and analyzed by any combination of the sensors 228, data aggregators 226, or gateways 204, before being sent on by the fog network 220 to the server 206 to answer the query. In this example, IoT devices 202 in the fog network 220 may select the sensors 228 used based on the query, such as adding data from flow sensors or temperature sensors. Further, if some of the IoT devices 202 are not operational, other IoT devices 202 in the fog network 220 may provide analogous data, if available.

In other examples, the operations and functionality described below with reference to FIGS. 5 to 9 may be embodied by an IoT or edge compute device in the example form of an electronic processing system, within which a set or sequence of instructions may be executed to cause the electronic processing system to perform any one of the methodologies discussed herein, according to an example embodiment. The device may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a computer) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 3:
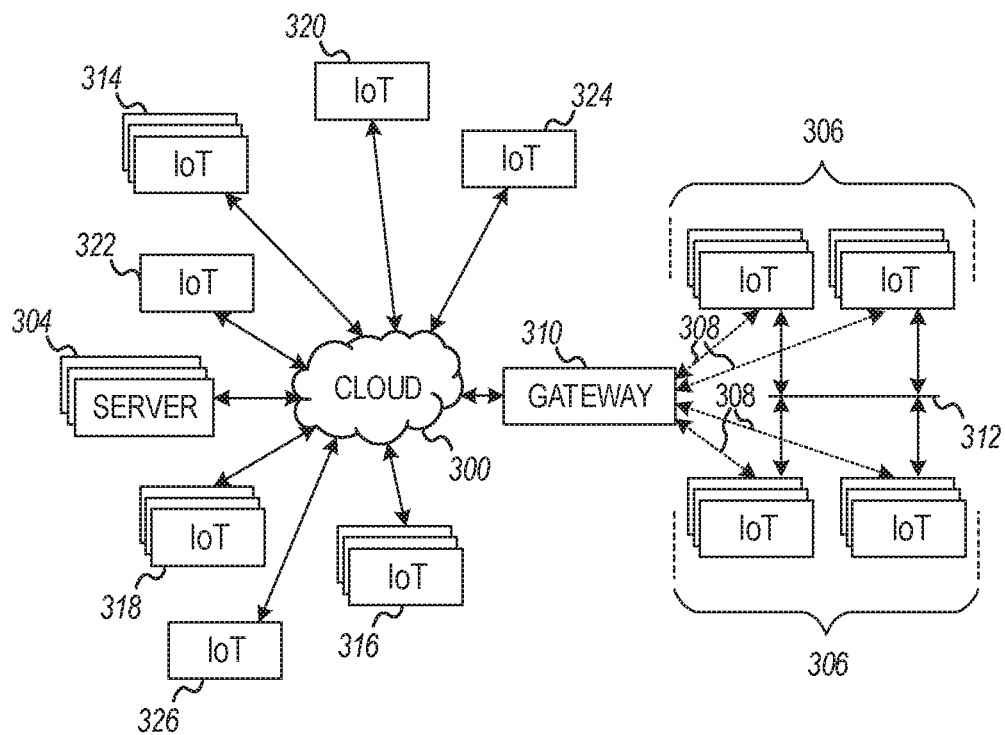
FIG. 3 illustrates a drawing of a cloud computing network, or cloud, in communication with a number of Internet of Things (IoT) devices, according to an example.

FIG. 3 illustrates a drawing of a cloud computing network, or cloud 300, in communication with a number of Internet of Things (IoT) devices. The cloud 300 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 300 through wired or wireless links 308, such as LPWA links, and the like. Further, a wired or wireless sub-network 312 may allow the IoT devices to communicate with each other, such as through a local area network, a wireless local area network, and the like. The IoT devices may use another device, such as a gateway 310 or 328 to communicate with remote locations such as the cloud 300; the IoT devices may also use one or more servers 330 to facilitate communication with the cloud 300 or with the gateway 310. For example, the one or more servers 330 may operate as an intermediate network node to support a local edge cloud or fog implementation among a local area network. Further, the gateway 328 that is depicted may operate in a cloud-to-gateway-to-many edge devices configuration, such as with the various IoT devices 314, 320, 324 being constrained or dynamic to an assignment and use of resources in the cloud 300.

Other example groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, with another IoT fog device or system (not shown, but depicted in FIG. 2), or a combination therein. The groups of IoT devices may be deployed in various residential, commercial, and industrial settings (including in both private or public environments).

As may be seen from FIG. 3, a large number of IoT devices may be communicating through the cloud 300. This may allow different IoT devices to request or provide information to other devices autonomously. For example, a group of IoT devices (e.g., the traffic control group 306) may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 300. This may allow the IoT devices to form an ad-hoc network between the devices, allowing them to function as a single device, which may be termed a fog device or system (e.g., as described above with reference to FIG. 2).

Figure 4:
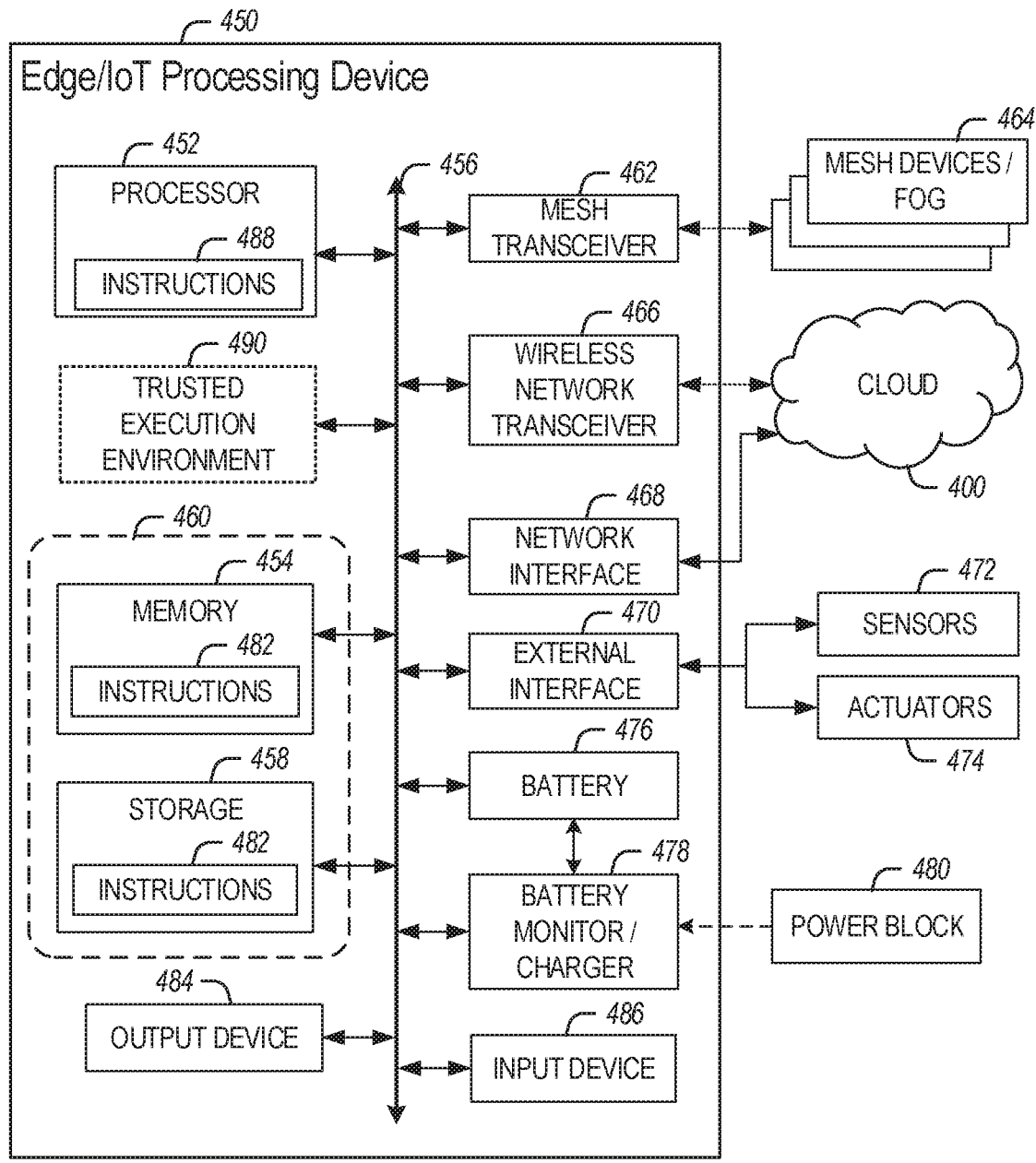
FIG. 4 illustrates a block diagram for an example IoT processing system architecture upon which any one or more of the techniques (e.g., operations, processes, methods, and methodologies) discussed herein may be performed, according to an example.

FIG. 4 is a block diagram of an example of components that may be present in an IoT device 450 for implementing the techniques described herein. The IoT device 450 may include any combinations of the components shown in the example or referenced in the disclosure above. The components may be implemented as ICs, portions thereof, discrete electronic devices, or other modules, logic, hardware, software, firmware, or a combination thereof adapted in the IoT device 450, or as components otherwise incorporated within a chassis of a larger system. Additionally, the block diagram of FIG. 4 is intended to depict a high-level view of components of the IoT device 450. However, some of the components shown may be omitted, additional components may be present, and different arrangement of the components shown may occur in other implementations.

The IoT device 450 may include processing circuitry in the form of a processor 452, which may be a microprocessor, a multi-core processor, a multithreaded processor, an ultra-low voltage processor, an embedded processor, or other known processing elements. The processor 452 may be a part of a system on a chip (SoC) in which the processor 452 and other components are formed into a single integrated circuit, or a single package, such as the Edison™ or Galileo™ SoC boards from Intel. As an example, the processor 452 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 452 may communicate with a system memory 454 over an interconnect 456 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 458 may also couple to the processor 452 via the interconnect 456. In an example the storage 458 may be implemented via a solid state disk drive (SSDD). Other devices that may be used for the storage 458 include flash memory cards, such as SD cards, microSD cards, xD picture cards, and the like, and USB flash drives. In low power implementations, the storage 458 may be on-die memory or registers associated with the processor 452. However, in some examples, the storage 458 may be implemented using a micro hard disk drive (HDD). Further, any number of new technologies may be used for the storage 458 in addition to, or instead of, the technologies described, such resistance change memories, phase change memories, holographic memories, or chemical memories, among others.

The components may communicate over the interconnect 456. The interconnect 456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 456 may be a proprietary bus, for example, used in a SoC based system. Other bus systems may be included, such as an I2C interface, an SPI interface, point to point interfaces, and a power bus, among others.

Given the variety of types of applicable communications from the device to another component or network, applicable communications circuitry used by the device may include or be embodied by any one or more of components 1262, 1266, 1268, or 1270. Accordingly, in various examples, applicable means for communicating (e.g., receiving, transmitting, etc.) may be embodied by such communications circuitry.

The interconnect 456 may couple the processor 452 to a mesh transceiver 462, for communications with other mesh devices 464. The mesh transceiver 462 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 464. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 462 may communicate using multiple standards or radios for communications at different range. For example, the IoT device 450 may communicate with close devices, e.g., within about 10 meters, using a local transceiver based on BLE, or another low power radio, to save power. More distant mesh devices 464, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 466 may be included to communicate with devices or services in the cloud 400 via local or wide area network protocols. The wireless network transceiver 466 may be a LPWA transceiver that follows the IEEE 802.15.4, or IEEE 802.15.4g standards, among others. The IoT device 450 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies.

Further, other communications techniques, such as time-slotted channel hopping, described in the IEEE 802.15.4e specification may be used.

Any number of other radio communications and protocols may be used in addition to the systems mentioned for the mesh transceiver 462 and wireless network transceiver 466, as described herein. For example, the radio transceivers 462 and 466 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 462 and 466 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 466, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 468 may be included to provide a wired communication to the cloud 400 or to other devices, such as the mesh devices 464. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 468 may be included to allow connect to a second network, for example, a NIC 468 providing communications to the cloud over Ethernet, and a second NIC 468 providing communications to other devices over another type of network.

The interconnect 456 may couple the processor 452 to an external interface 470 that is used to connect external devices or subsystems. The external devices may include sensors 472, such as accelerometers, level sensors, flow sensors, optical light sensors, camera sensors, temperature sensors, a global positioning system (GPS) sensors, pressure sensors, barometric pressure sensors, and the like. The external interface 470 further may be used to connect the IoT device 450 to actuators 474, such as power switches, valve actuators, an audible sound generator, a visual warning device, and the like.

In some optional examples, various input/output (I/O) devices may be present within, or connected to, the IoT device 450. For example, a display or other output device 484 may be included to show information, such as sensor readings or actuator position. An input device 486, such as a touch screen or keypad may be included to accept input. An output device 486 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 450.

A battery 476 may power the IoT device 450, although in examples in which the IoT device 450 is mounted in a fixed location, it may have a power supply coupled to an electrical grid. The battery 476 may be a lithium ion battery, or a metal-air battery, such as a zinc-air battery, an aluminum-air battery, a lithium-air battery, and the like.

A battery monitor/charger 478 may be included in the IoT device 450 to track the state of charge (SoCh) of the battery 476. The battery monitor/charger 478 may be used to monitor other parameters of the battery 476 to provide failure predictions, such as the state of health (SoH) and the state of function (SoF) of the battery 476. The battery monitor/charger 478 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 478 may communicate the information on the battery 476 to the processor 452 over the interconnect 456. The battery monitor/charger 478 may also include an analog-to-digital (ADC) convertor that allows the processor 452 to directly monitor the voltage of the battery 476 or the current flow from the battery 476. The battery parameters may be used to determine actions that the IoT device 450 may perform, such as transmission frequency, mesh network operation, sensing frequency, and the like.

A power block 480, or other power supply coupled to a grid, may be coupled with the battery monitor/charger 478 to charge the battery 476. In some examples, the power block 480 may be replaced with a wireless power receiver to obtain the power wirelessly, for example, through a loop antenna in the IoT device 450. A wireless battery charging circuit, such as an LTC4020 chip from Linear Technologies of Milpitas, Calif., among others, may be included in the battery monitor/charger 478. The specific charging circuits chosen depend on the size of the battery 476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 458 may include instructions 482 in the form of software, firmware, or hardware commands to implement the techniques described herein. Although such instructions 482 are shown as code blocks included in the memory 454 and the storage 458, it may be understood that any of the code blocks may be replaced with hardwired circuits, for example, built into an application specific integrated circuit (ASIC).

In an example, the instructions 482 provided via the memory 454, the storage 458, or the processor 452 may be embodied as a non-transitory, machine readable medium 460 including code to direct the processor 452 to perform electronic operations in the IoT device 450. The processor 452 may access the non-transitory, machine readable medium 460 over the interconnect 456. For instance, the non-transitory, machine readable medium 460 may be embodied by devices described for the storage 458 of FIG. 4 or may include specific storage units such as optical disks, flash drives, or any number of other hardware devices. The non-transitory, machine readable medium 460 may include instructions to direct the processor 452 to perform a specific sequence or flow of actions, for example, as described with respect to the flowchart(s) and block diagram(s) of operations and functionality depicted above.

Also in a specific example, the instructions 488 on the processor 452 (separately, or in combination with the instructions 488 of the machine readable medium 460) may configure execution or operation of a trusted execution environment (TEE) 490. In an example, the TEE 490 operates as a protected area accessible to the processor 452 for secure execution of instructions and secure access to data. Various implementations of the TEE 490, and an accompanying secure area in the processor 452 or the memory 454 may be provided, for instance, through use of Intel® Software Guard Extensions (SGX) or ARM® TrustZone® hardware security extensions, Intel® Management Engine (ME), or Intel Converged Security Manageability Engine (CSME). Other aspects of security hardening, hardware roots-of-trust, and trusted or protected operations may be implemented in the device 450 through the TEE 490 and the processor 452.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Figure 5:
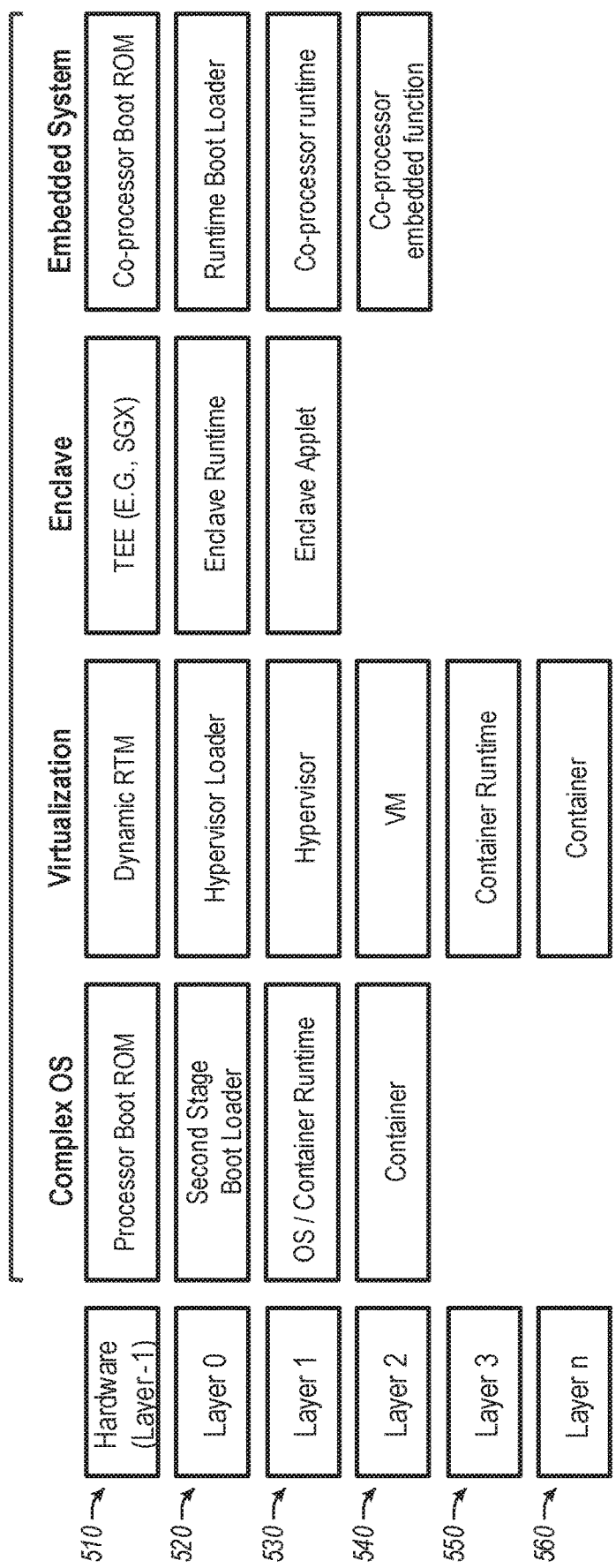
FIG. 5 illustrates examples of layers, upon which any one or more of the techniques (e.g., operations, processes, methods, and methodologies) discussed herein may be implemented, according to an example.

FIG. 5 illustrates examples of layers, upon which any one or more of the example techniques (e.g., operations, processes, methods, and methodologies) discussed herein may be performed. As shown, various types of components (a complex OS, Virtualization platform, Enclave platform, or Embedded system) include a variety of layers, which are separated into hardware (Layer −1 510) and higher abstraction layers (Layers 0 to N, shown as layers 520, 530, 540, 550, 560, which may include layers of firmware, software, etc.). As detailed in the following examples, a distributed TCB architecture may be adapted among any of these components to perform security operations such as enrollment, attestation, etc., including in a DICE-compliant manner and with the use of attestation vouchers.

Generation and Uses of Vouchers

Edge computing and IoT device environments include devices and components within such devices that are often supplied by many different entities—involving multiple manufacturers, component providers, platform vendors, value-added-resellers (VARs) and retailers. Each stakeholder in the edge ecosystem may perform their own form of "physical orchestration" of platforms they own or control. Manufacturers of platforms also may have operational mandates, such as requiring that equipment in an edge deployment verify that the entity onboarded to the platform—and the entity performing the onboarding—is the intended entity. To accomplish these mandates, the generation of use and vouchers is discussed below.

As a comparison of the present vouchers with previous approaches, the Internet Engineering Task Force (IETF) has provided a definition of a voucher data structure which provides an electronic record that is issued by a current platform owner to identify a next platform owner. However, these vouchers do not specify a root of trust entity that retains partial ownership of the platform in the event that a sub-component requires a firmware, microcode or secure code (e.g., xucode) patch or security update. Thus, the voucher will not retain entity information as ownership is transferred.

Additionally, other efforts such as Secure Device Onboard (SDO) have described an "ownership voucher" for use with IoT onboarding and management operations. In an SDO environment, an Ownership Voucher can be used to enable a platform to prove to an IoT device that it is the rightful owner of the device. The Ownership Voucher is created originally by the original device manufacturer (ODM) or original equipment manufacturer (OEM), and the Ownership Voucher passes through the supply chain until it arrives at the end user who registers it with their desired target platform. Additionally, in this use case, the voucher will not retain entity information as ownership is transferred, preventing involvement by a previous trusted owner.

Thus, in both of these scenarios, existing designs of vouchers fall short of enabling security and validity of possible use cases. The following describes a method for supporting vouchers with features of a hardware root of trust, which enables secure onboarding operations, in addition to later deployment of patches, security updates, and other data from trusted supply chain entities. With the vouchers discussed herein, a platform may be configured to effectively recognize certain supply chain entities as "partial owners," thus allowing the platform to verify partial ownership even after transferring ownership with voucher issuance to a new owner. This voucher may be changed and communicated among multiple entities in a supply chain (prior to end user device ownership) and among entities in a variety of ownership and privilege scenarios.

The following description provides reference to the use of vouchers and verification operations as part of device onboarding, ownership transfers, and maintenance, updates, or modification of components within a device. Other use cases of vouchers and trusted computing operations, including those in Information-Centric Networks (ICN), Named Function Networks (NFN), and variations of content centric or name centric networking, will also be apparent from these examples. For example, the use of vouchers may be implemented within an ICN or NFN system or network abstraction, to enable many types of configurable entities to join, access data, communicate on, and leave the ICN or NFN network in a dynamic and trusted fashion. The presently disclosed forms of vouchers may also provide other advantages in place of certificates, signed documents, and other attestation or authentication evidence used within an ICN or NFN.

Figure 6A:
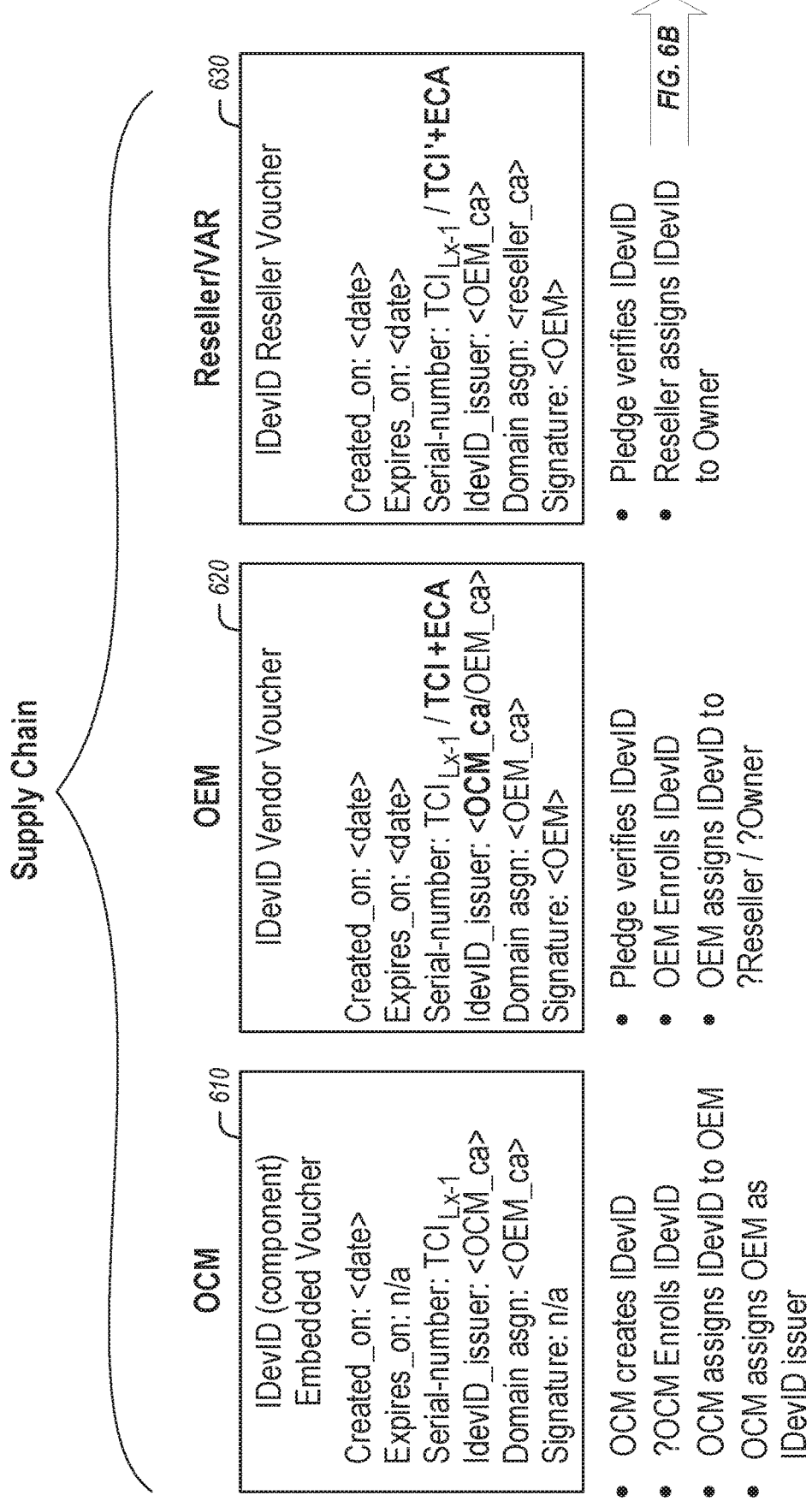

FIGS. 6A and 6B illustrates a progressive arrangement of embedded and digital vouchers implementing a supply chain onboarding use case for a computing device, also referred to as a "platform," which includes one or more hardware components. The listing of vouchers for a supply chain in FIG. 6A and an owner domain in FIG. 6B depicts a scenario involving the generation of an initial device identifier (IDevID) and a locally significant device identifier, or "local" device identifier (LDevID), such as is specified by the Security Device Identity specification in IEEE 802.1AR. A device with secure device identity capability incorporates a globally unique Initial Device Identifier (IDevID), with the IDevID stored in a way that protects the identifier from modification. The device may also support the creation of LDevIDs. Each LDevID is bound to the device in a way that makes it infeasible for the identifier to be forged or transferred to a device with a different IDevID without knowledge of the private key used to effect the cryptographic binding.

In detail, FIG. 6A depicts a supply chain scenario where an embedded voucher 610 identifies the OCM (Original Component Manufacturer) as the entity authorized to issue a DICE component/layer identifier (aka IDevID). If the identifier ever requires re-issuance (for example, the security version number of the component must be altered due to a security event), then the certificate authority (CA) for OCM (the OCM-CA) is named in the embedded voucher 610 as an entity authorized to perform this action. Because the embedded voucher 610 is locked down in a root-of-trust (e.g., a DICE root of trust), it cannot be easily modified by an attacker. Further implementations may even include multiple backup (alternative) OCM-CA values (not shown) in case a first OCM-CA private key becomes compromised.

In an example implementation, the embedded voucher 610 contains a domain assignment where a target owner CA (e.g., an OEM-CA) is identified. In the context of an ecosystem partnership, the OCM may be obligated by a legal contract or obligation to supply a component to an OEM. The embedded voucher 610 captures this expectation using a Domain Assign (domain assignment) field that names the intended OEM-CA. This authorizes the component, if asked, to verify that the Domain Assignment entity is correct and extant. Implementations of the embedded voucher 610 also may include multiple backup (alternative) domain assignment CA public key values (not shown) in case a first CA private key is compromised.

The IDevID issuer CA also authorizes the issuance of a next voucher such as the OEM voucher 620 which may be a digital document dynamically issued by a server. This voucher is supplied with the platform/device/component and identifies the platform/device/component, such as using the Serial Number where a composite serial number may be computed using the serial numbers of one or more platforms/devices/components comprising a more sophisticated platform/device/component. For example, in a DICE architecture, a layer-specific TCB Component Identifier $TCI_{x1}$ (e.g., serial number used in the embedded voucher) may be replaced by a composite TCI (e.g., TCI=Hash($TCI_{x1}$, $TCI_{x2}$, ..., $TCI_{xn}$), etc. ...). Furthermore, the platform/device/component may include an embedded CA capability further specializing the resulting serial number value.

The voucher issuer may specify a next intended platform, device, or component identifier authority (e.g., the IDevID Issuer) that may be the OEM or may be unmodified from its current value (e.g., the OCM). The embedded voucher 610 also may contain a policy bit that authorizes (controls whether or not) if the IDevID Issuer value in the embedded voucher 610 can be overridden.

The assigned domain (e.g., OEM) may be retained or delegated to a next supply chain entity. If delegated, the next supply chain entity (e.g., reseller or value-added reseller (VAR)) is responsible for issuing a next voucher (e.g., voucher 630) and so forth until the intended owner is named in an owner domain, such as with owner voucher 640 in FIG. 6B. If not, the delegated OEM retains the right and must identify the intended owner and issue an owner voucher 640.

Retention of the right to issue the owner voucher 640 does not, however, imply that there cannot be other supply chain entities participating in moving the platform/device/component to a next supply chain entity such as a reseller. However, the reseller or other entities in the supply chain might not onboard, modify or retool any devices. However, if these functions are performed by another supply chain entity, such as a value added reseller (VAR), then the OEM may issue a voucher specially authorizing this. Additionally, the OEM (or VAR) may issue an owner voucher naming the owner as the expected domain assignee. The IDevID issuer may be retained as a 'partial owner' in that changes to the platform affecting the serial number computation may be withheld from the owner.

The Owner may issue a second voucher 650 for the platform/device/component that identifies a local identifier (LDevID) where the owner is retained as the Domain assignee but where the LDevID issuer is also the owner. This provides the Owner with greater flexibility to manage the complete lifecycle of the platform/device/component, except where there are roots of trust or layered TCB elements that a supply chain entity retains for ongoing lifecycle management.

Although FIGS. 6A and 6B illustrate a scenario where a voucher structure identifies a single 'domain assignee' using two forms of identity, IDevID and LDevID, it will be apparent that other approaches may involve listing a different domain assignee for the identities. In such scenarios, both a IDevID domain assignee and an LDevID domain assignee may be included as separate fields in the voucher. With the use of multiple domain assignee fields, the voucher structure is similar to that depicted in FIGS. 6A and 6B, but the consumer of the voucher can easily understand that there is a difference between the domain assignees for each type of device ID. This voucher structure is depicted in more detail in FIG. 11B.

Figure 7:
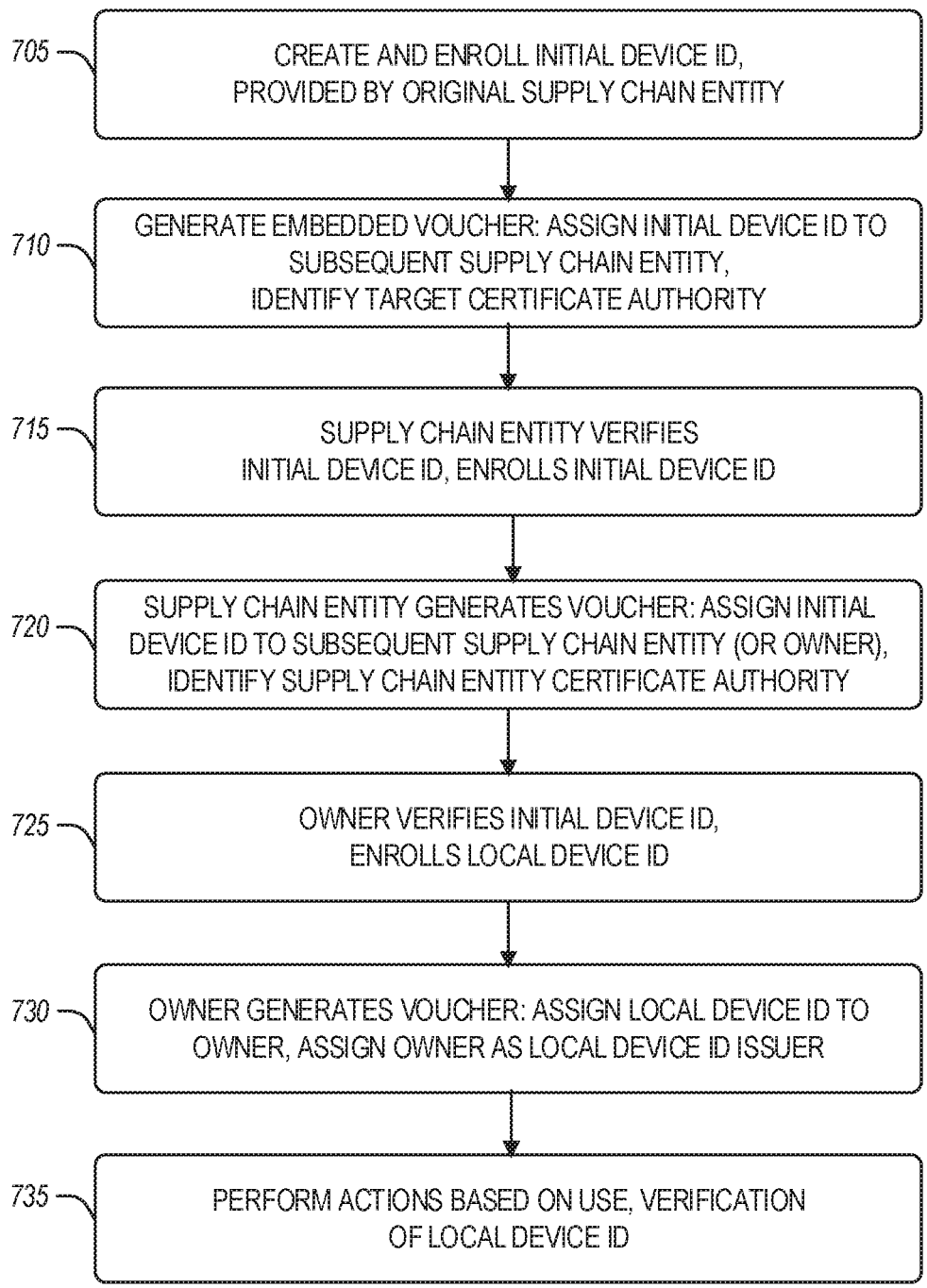
FIG. 7 illustrates a flowchart of a method for implementing embedded and digital vouchers, in a supply chain onboarding use case, according to an example.

FIG. 7 illustrates a flowchart 700 of a method for implementing the vouchers depicted in FIG. 6, with a sequence of simplified operations. The flowchart 700 first depicts the creation and enrollment of an initial device ID (e.g., IDevID) value for use within an embedded voucher, based on values provided by an original supply chain entity (operation 705). The embedded voucher is then generated, based on values that assign the initial device ID to a subsequent supply chain entity, and identify a certificate authority associated with the target/subsequent supply chain entity (operation 710).

With this information, a subsequent voucher can be created for use by the subsequent supply chain entity. This subsequent voucher can be created by verification of an initial device ID and enrollment of a new initial device ID value (operation 715), with the voucher being generated by the subsequent supply chain entity by assigning the new initial device ID value to a subsequent supply chain entity and identifying a certificate authority (operation 720). This may be repeated for subsequent entities in the supply chain (repeating operations 715, 720) until assignment of an initial device ID to an owner.

Additional operations are performed by an owner to verify the initial device ID and enroll a local device ID (operation 725) for use in the owner domain; then, an owner generates a voucher that assigns the local device ID to the owner, and assigns the owner as a local device ID issuer (operation 730). Actions can be performed by the owner (operation 735) based on the use and verification, as appropriate, for the local device ID.

Figure 8:
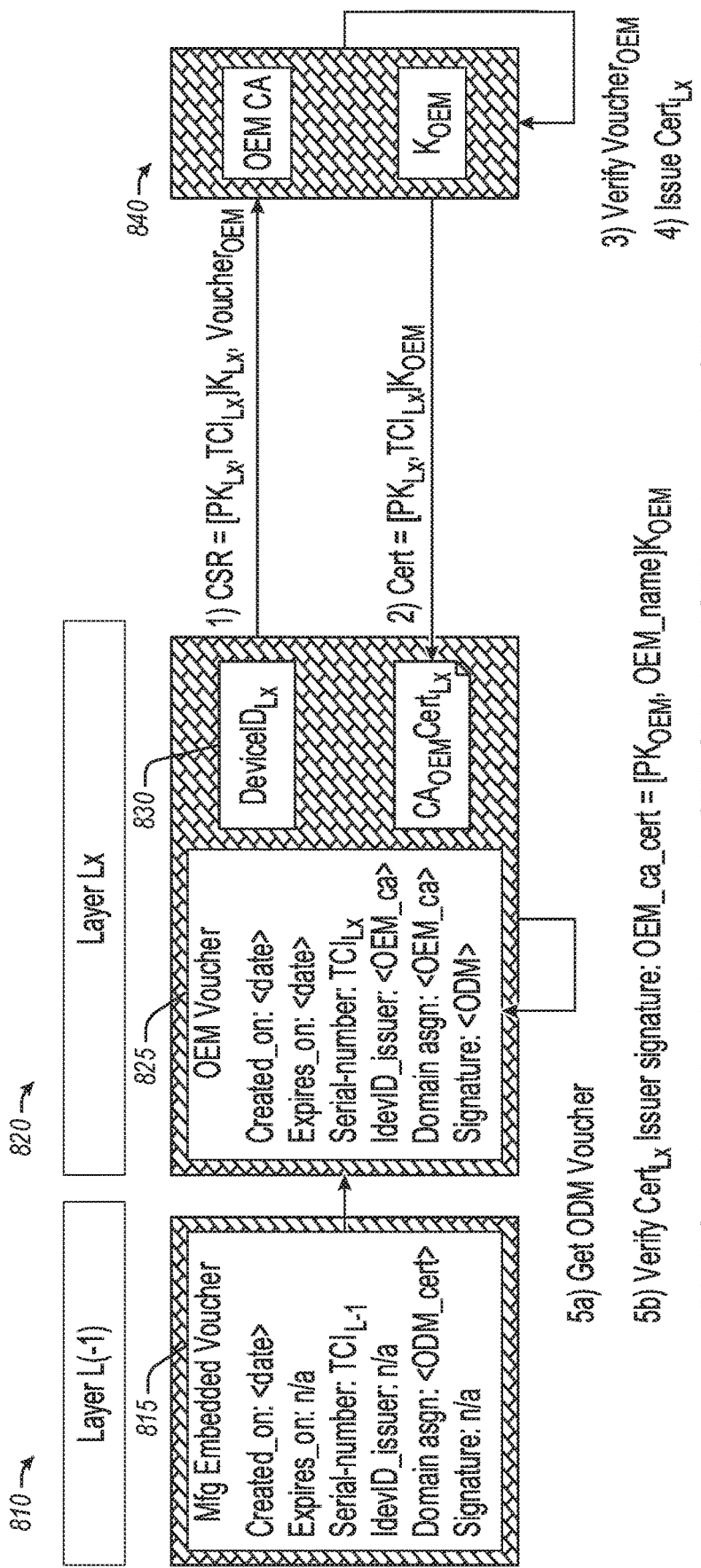
FIG. 8 illustrates a DICE component layering architecture, according to an example.

FIG. 8 illustrates a DICE component layering architecture which implements supply chain and ownership vouchers as discussed herein. Specifically, in this architecture, a first DICE layer 810 implements an embedded voucher 815 and a next layer 820 implements a digital voucher 825 (OEM voucher) which is associated with a DICE component or platform ID 830. Together, the voucher 825 and information from the component or ID 830 allows the supply chain entity to verify (and, onboard/re-onboard) the layer securely, using a CA 840, to enable the layer to verify (vouch for) the supply chain entity authorization to perform the action (e.g., onboarding/re-onboarding).

Figure 9:
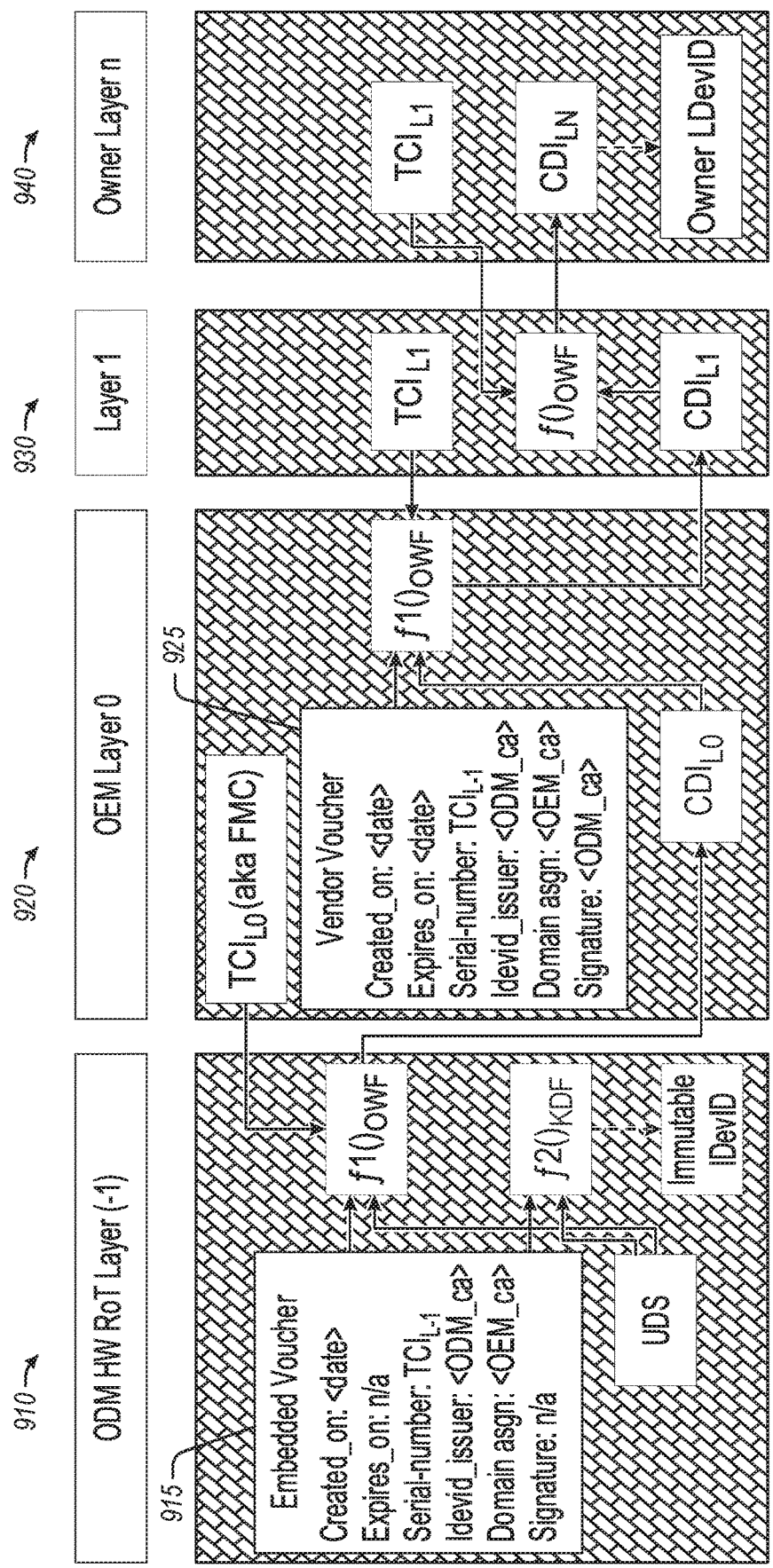
FIG. 9 illustrates a system of vouchers combined with a DICE layering architecture, according to an example.

FIG. 9 further illustrates a scenario where vouchers 915, 925 can be combined with a DICE layering architecture established among layers 910, 920, 930, 940. In this setting, the DICE Composite Device Identifier (CDI) calculation includes a current layer embedded or digital voucher such that the resultant CDI value is specific to the vouchers assigned to the respective layers.

Figure 10A:
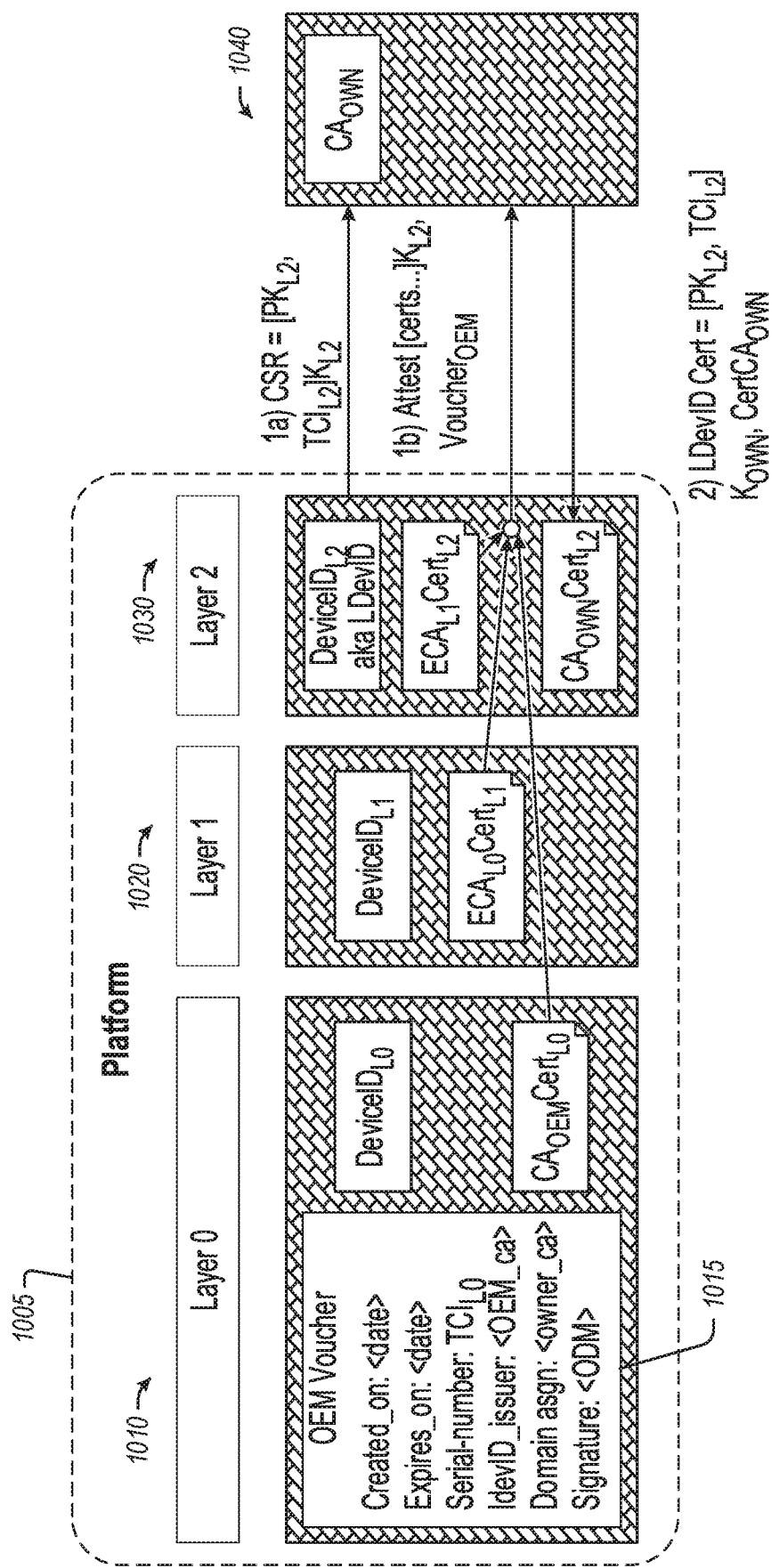
FIGS. 10A and 10B illustrates platform configurations for a system of vouchers and device identifiers, according to an example.

Building on this example, FIG. 10A illustrates a platform 1005 containing a system of vouchers and device identifiers that may be specific to a DICE layer or layers (e.g., layers 1010, 1020, 1030) for performing a device, component or platform onboarding operation. This operation may occur where the owner CA 1040 uses information from an OEM voucher 1015 and other layers to verify the platform 1005 is the intended entity to be onboarded, and where the platform 1005 verifies the owner is the intended new owner. In this setting, the owner may issue a local component, platform or device identity (e.g., LDevID) that is used to prove membership in the owner's network or domain and where the voucher authorizes issuance of the LDevID by the owner.

FIG. 10A specifically depicts an example where an LDevID is constructed at a Layer-2 TCB. While this is an acceptable scenario for constructing an identifier when onboarding, other attestation use cases may occur after onboarding into an owner network. As a result, attestation use cases involving DICE layers become complex, and require the Verifier to traverse the layers verifying the intermediate layers' attestation evidence. In particular, the DICE Attestation architecture shows an embedded CA at each intermediate layer where the attestation evidence for the next layer is contained within the certificate issued by the previous layer.

Figure 10B:
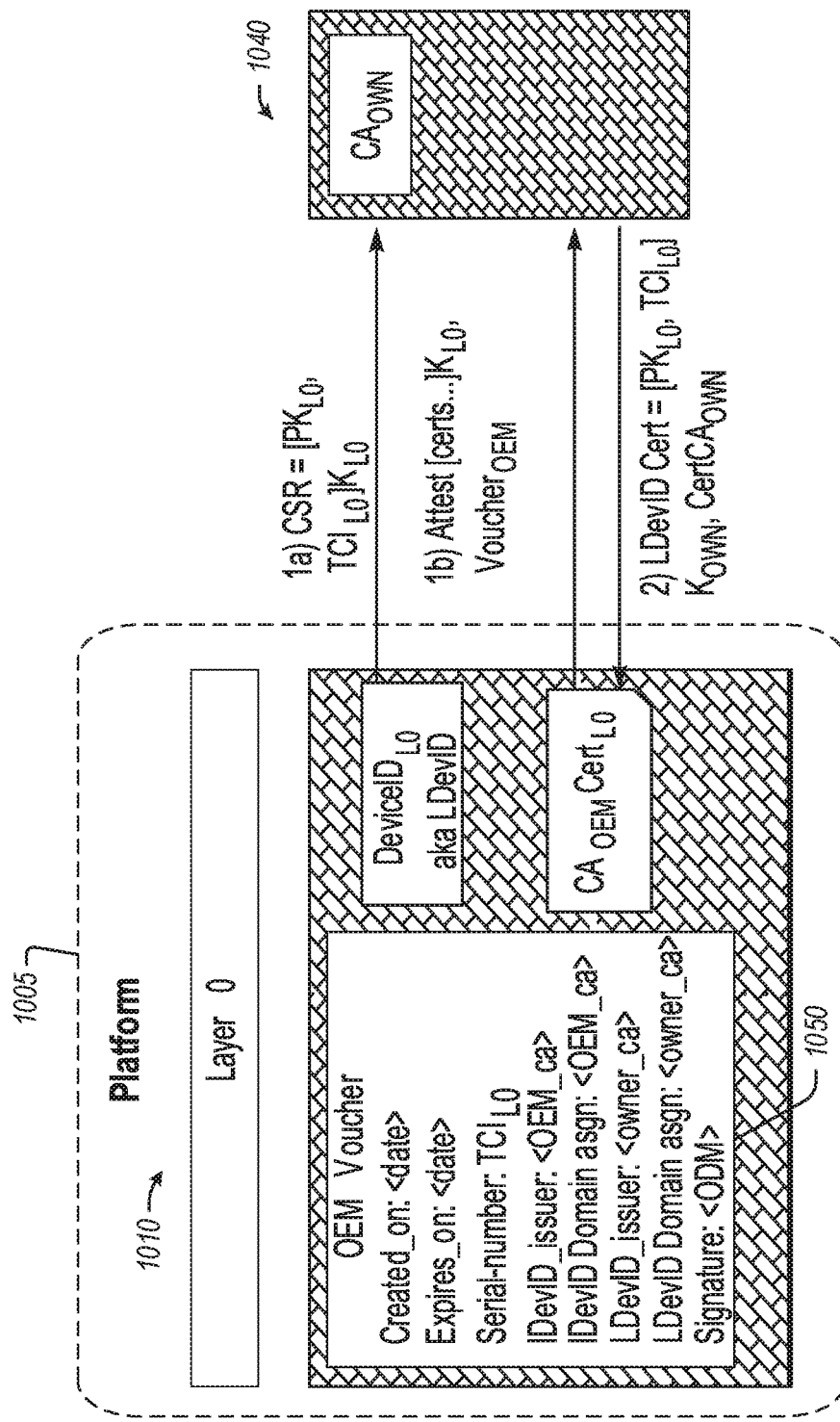

FIG. 10B depicts a simplified onboarding use case, where the assignment of an LDevID occurs at Layer-0 1010, as a voucher 1050 authorizes the LDevD Domain assignee at Layer-0 1010. This authorization might be provided in response to a similar onboarding use case described above for FIG. 10A; however, instead of supplying DeviceID_L2, the Layer-0 1010 supplies DeviceID_L0. The new owner (CA_Own) can assert (override) three privileges belonging to the various layers in the form of certificate Policy OIDs where OID_eca, OID_devid, OID_attest are defined. The CA_Own might assign all three to the new Local Layer-0 certificate.

The benefits of the simplified architecture of FIG. 10B occurs post-onboarding, as the device has two possible ways to certify the layers. First, the device can certify the layers through a certificate chain that is rooted to the supply chain (VAR/OEM/ODM/OCM); or second, the device can certify the layers through a certificate chain that is rooted to the Owner. When the device re-boots as an "owned" device, it re-generates the Layer-0 through Layer-n certificates with the local (Owner_CA) as the issuer of the Layer-0 certificate (LDevID), because the voucher has retained control of the IDevID issuance to the Owner_CA. The Layer-0 ECA issues the Layer-1 certificate and so on to Layer-n.

The significance of the second certificate chain within the Owner's network is that peer nodes seeking to verify attestations originating from the onboarded device do not need to maintain trust anchors that fall outside of the Owner's network. All peers can provision only the Owner_CA trust anchor but still be able to walk the certificate chain following the layers back to Layer-0 then to the Owner_CA. Further, the peer nodes trust that the onboarding entity verified the supply chain entities and root of trust (e.g. Layer −1), so the new owner at Layer-0 does not need to chain to the supply chain entities. Also, because the root-of-trust is immutable, it does not need to be re-verified every time the device resets or reboots.

Finally, the approach provided in FIG. 10B enables a method for a current Owner to rescind ownership, defaulting back to the supply chain-established ownership while enabling the current Owner to hand-off ownership to a second Owner. This enables an Owner to give up ownership rights while retaining the existing supply chain ownership history.

Other platforms (e.g., including those depicted in FIG. 5, such as virtualization, embedded systems, complex operating systems) or types of hardware or architectures (e.g., Intel SOX, and ARM TrustZone) may be utilized to implement or coordinate the layers detailed above (including for layers in compliance with TCB features).

Figure 11:
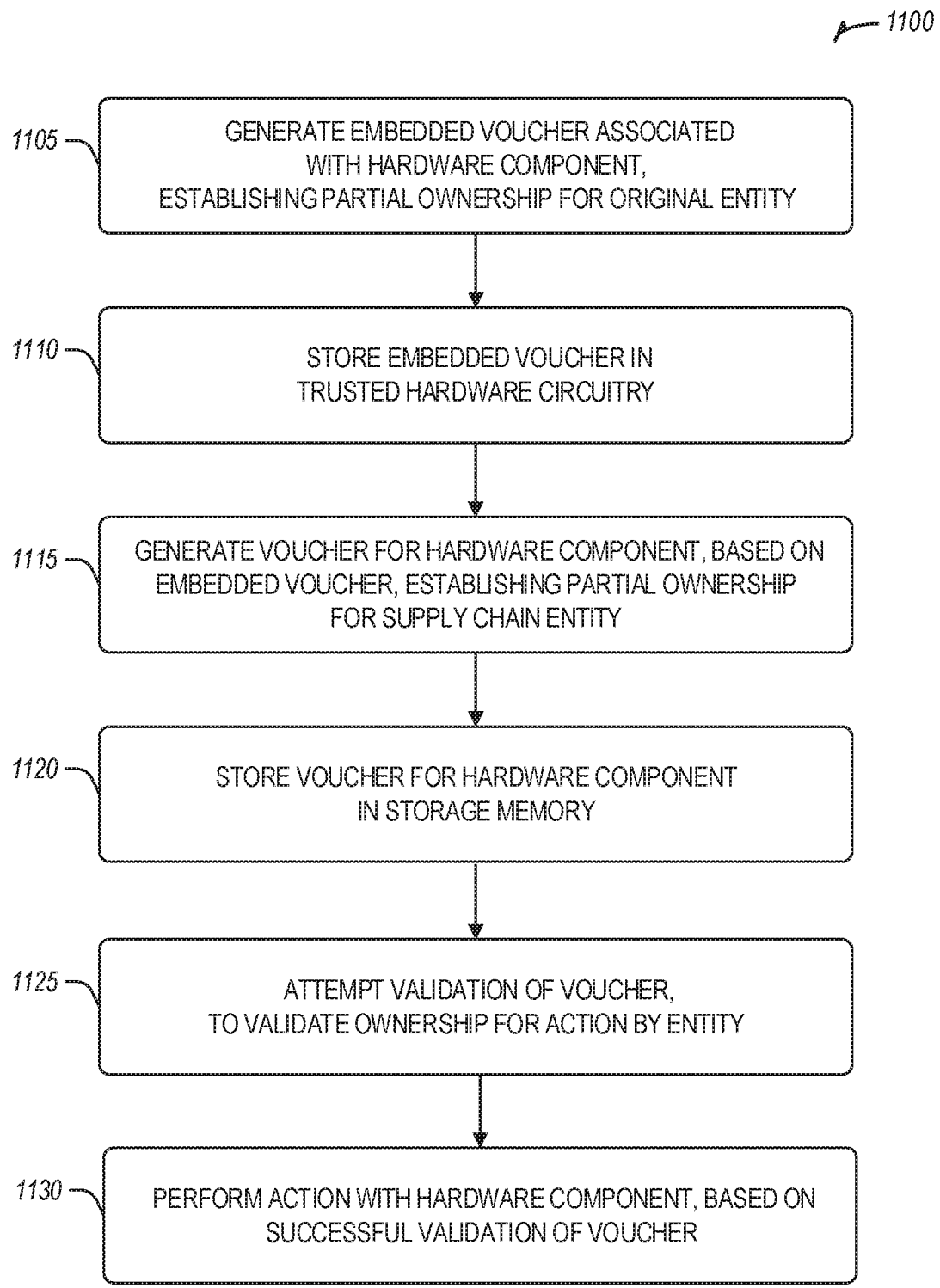
FIG. 11 illustrates a flowchart of a method for deployment and use of embedded and digital vouchers, according to an example.

FIG. 11 illustrates a flowchart 1100 of a method for establishing a voucher used for attesting ownership of a hardware component of the computing device. This flowchart 1100 is provided from the perspective of an entity which generates, stores, and uses vouchers; it will be understood that fewer or additional operations may be involved with other entities and computing devices.

The flowchart 1100 begins with the generation of an embedded voucher, associated with a hardware component, which establishes partial ownership of an original entity (operation 1105). This voucher may include an identifier for the hardware component, as the identifier is generated on behalf of an original entity authorized to issue the identifier. This embedded voucher may be stored in trusted hardware circuitry (operation 1110). For instance, the embedded voucher may be stored in trusted hardware circuitry that provides a hardware root of trust, in a setting where the embedded voucher is unmodifiable in the hardware root of trust.

The flowchart 1100 continues with operations to generate a voucher for the hardware component (operation 1115), based on information in the embedded voucher which establishes partial ownership for a supply chain entity. This voucher may include a second identifier that is provided on behalf of a subsequent entity, as the second identifier is generated based on the identifier for the hardware component included in the embedded voucher. For instance, the second identifier may be based on a second composite device identifier, and the composite device identifier is assigned to the original entity in the embedded voucher, where the second composite device identifier is assigned to the subsequent entity in the voucher. With these configurations, the voucher may be enabled to identify ownership rights in the hardware component for both the original entity and the subsequent entity. This voucher may be stored in storage memory (operation 1120).

The flowchart 1110 continues with operations to attempt validation of the voucher (operation 1125) to validate ownership of an entity (the original entity, the subsequent supply chain entity, another supply chain or owner entity, etc.) to perform some action. This action may be one of: onboarding, updating, retooling, or reconfiguration of the hardware component. Based on successful validation of the ownership rights for the voucher, the action is performed (operation 1130). For instance, the voucher may identify ownership rights where the original entity is identified as a partial owner of the hardware component, and the subsequent entity is identified as a partial owner of the hardware component.

In further operations, an existing Owner may remove or revoke existing vouchers that show this entity as the Owner. The reset/revoke operation falls back to the embedded voucher (and back to operation 1115) in terms of ownership and allows for the device to be re-assigned to a different owner.

Additionally, in some cases, instead of a reset, the desired behavior is for the existing owner to specify a second owner by issuing a voucher. This allows the second owner to assert local ownership (e.g., LDevID) but without disrupting the supply chain vouchers, and requiring the supply chain to reconstruct a voucher path to the second local owner. Then, the first owner gives up ownership when handing off to the second owner.

Further aspects of the embedded voucher and voucher is provided with reference to the voucher details depicted in FIGS. 6A and 6B, and the architecture depicted in FIGS. 8 to 10B. For instance, the identifier may be based on a composite device identifier provided within a Device Identifier Composition Engine (DICE) architecture.

Additional examples of the presently described method, system, and device embodiments include the following, non-limiting configurations described in the claims. Each of the following non-limiting examples may stand on its own, or may be combined in any permutation or combination with any one or more of the other examples provided below or throughout the present disclosure.

Example 1 is a computing device, comprising: a hardware component; trusted hardware circuitry, configured to provide data for an embedded voucher associated with the hardware component, wherein the embedded voucher includes an identifier for the hardware component and the identifier is generated on behalf of an original entity authorized to issue the identifier; and storage memory, configured to store a voucher for validation of the hardware component, wherein the voucher includes a second identifier that is provided on behalf of a subsequent entity and the second identifier is generated based on the identifier for the hardware component included in the embedded voucher, wherein the voucher identifies ownership rights in the hardware component for both of the original entity and the subsequent entity.

In Example 2, the subject matter of Example 1 optionally includes subject matter where the trusted hardware circuitry provides a hardware root of trust, and wherein the embedded voucher is unmodifiable in the hardware root of trust.

In Example 3, the subject matter of anyone or more of Examples 1-2 optionally include subject matter where the identifier is based on a composite device identifier provided within a Device Identifier Composition Engine (DICE) architecture.

In Example 4, the subject matter of Example 3 optionally includes subject matter where the second identifier is based on a second composite device identifier, wherein the composite device identifier is assigned to the original entity in the embedded voucher, and wherein the second composite device identifier is assigned to the subsequent entity in the voucher.

In Example 5, the subject matter of anyone or more of Examples 3-4 optionally include subject matter where the second identifier is generated based on multiple hardware layers in the DICE architecture.

In Example 6, the subject matter of any one or more of Examples 1-5 optionally include subject matter where the voucher identifies the original entity as a partial owner of the hardware component, and identifies the subsequent entity as a partial owner of the hardware component.

In Example 7, the subject matter of any one or more of Examples 1-6 optionally include subject matter where the embedded voucher and the voucher include information that indicates: a certificate authority associated with an issuer of the respective voucher, and a certificate authority associated with an assignment of ownership in the respective voucher.

In Example 8, the subject matter of anyone or more of Examples 1-7 optionally include circuitry configured to: attempt validation of the voucher, to validate ownership rights for the original entity or the subsequent entity; and perform an action with the hardware component, based on successful validation of the voucher.

In Example 9, the subject matter of Example 8 optionally includes subject matter where the action is one of: onboarding, updating, retooling, or reconfiguration of the hardware component.

In Example 10, the subject matter of anyone or more of Examples 1-9 optionally include subject matter where the original entity is an original component manufacturer, and wherein the subsequent entity is one of a: original equipment manufacturer, reseller, value added reseller, owner, or platform.

Example 11 is at least one machine-readable storage medium comprising instructions stored thereupon, which when executed by processing circuitry of a computing system, cause the processing circuitry to perform operations comprising: accessing an embedded voucher associated with a hardware component of the computing system, wherein the embedded voucher includes an identifier for the hardware component and the identifier is generated on behalf of an original entity authorized to issue the identifier; accessing a voucher, wherein the voucher includes a second identifier that is provided on behalf of a subsequent entity and the second identifier is generated based on the identifier for the hardware component included in the embedded voucher, wherein the voucher identifies ownership rights in the hardware component for both of the original entity and the subsequent entity; and performing an action in the computing system, based on validation of the voucher.

In Example 12, the subject matter of Example 11 optionally includes subject matter where the embedded voucher is stored in trusted hardware circuitry that provides a hardware root of trust, and wherein the embedded voucher is unmodifiable in the hardware root of trust.

In Example 13, the subject matter of any one or more of Examples 11-12 optionally include subject matter where the identifier is based on a composite device identifier provided within a Device Identifier Composition Engine (DICE) architecture.

In Example 14, the subject matter of Example 13 optionally includes subject matter where the second identifier is based on a second composite device identifier, wherein the composite device identifier is assigned to the original entity in the embedded voucher, and wherein the second composite device identifier is assigned to the subsequent entity in the voucher.

In Example 15, the subject matter of any one or more of Examples 13-14 optionally include subject matter where the second identifier is generated based on multiple hardware layers in the DICE architecture.

In Example 16, the subject matter of any one or more of Examples 11-15 optionally include subject matter where the voucher identifies the original entity as a partial owner of the hardware component, and identifies the subsequent entity as a partial owner of the hardware component.

In Example 17, the subject matter of any one or more of Examples 11-16 optionally include subject matter where the embedded voucher and the voucher include information that indicates: a certificate authority associated with an issuer of the respective voucher, and a certificate authority associated with an assignment of ownership in the respective voucher.

In Example 18, the subject matter of any one or more of Examples 11-17 optionally include the instructions further to perform operations comprising: attempting the validation of the voucher, to validate ownership rights for the original entity or the subsequent entity; wherein the action is performed with the hardware component based on successful validation of the voucher.

In Example 19, the subject matter of Example 18 optionally includes subject matter where the action is one of: onboarding, updating, retooling, or reconfiguration of the hardware component.

In Example 20, the subject matter of any one or more of Examples 11-19 optionally include subject matter where the original entity is an original component manufacturer, and wherein the subsequent entity is one of a: original equipment manufacturer, reseller, value added reseller, owner, or platform.

Example 21 is a method, performed in a computing device, of using a voucher to attest ownership of a hardware component of the computing device, the method comprising: accessing an embedded voucher associated with the hardware component of the computing device, wherein the embedded voucher includes an identifier for the hardware component and the identifier is generated on behalf of an original entity authorized to issue the identifier; accessing a voucher, wherein the voucher includes a second identifier that is provided on behalf of a subsequent entity and the second identifier is generated based on the identifier for the hardware component included in the embedded voucher, wherein the voucher identifies ownership rights in the hardware component for both of the original entity and the subsequent entity; and performing an action with the computing device, based on validation of the voucher.

In Example 22, the subject matter of Example 21 optionally includes subject matter where the embedded voucher is stored in trusted hardware circuitry that provides a hardware root of trust, and wherein the embedded voucher is unmodifiable in the hardware root of trust.

In Example 23, the subject matter of anyone or more of Examples 21-22 optionally include subject matter where the identifier is based on a composite device identifier provided within a Device Identifier Composition Engine (DICE) architecture.

In Example 24, the subject matter of Example 23 optionally includes subject matter where the second identifier is based on a second composite device identifier, wherein the composite device identifier is assigned to the original entity in the embedded voucher, and wherein the second composite device identifier is assigned to the subsequent entity in the voucher.

In Example 25, the subject matter of any one or more of Examples 23-24 optionally include subject matter where the second identifier is generated based on multiple hardware layers in the DICE architecture.

In Example 26, the subject matter of anyone or more of Examples 21-25 optionally include subject matter where the voucher identifies the original entity as a partial owner of the hardware component, and identifies the subsequent entity as a partial owner of the hardware component.

In Example 27, the subject matter of anyone or more of Examples 21-26 optionally include subject matter where the embedded voucher and the voucher include information that indicates: a certificate authority associated with an issuer of the respective voucher, and a certificate authority associated with an assignment of ownership in the respective voucher.

In Example 28, the subject matter of anyone or more of Examples 21-27 optionally include the method further comprising: attempting the validation of the voucher, to validate ownership rights for the original entity or the subsequent entity; wherein the action is performed with the hardware component based on successful validation of the voucher.

In Example 29, the subject matter of Example 28 optionally includes subject matter where the action is one of: onboarding, updating, retooling, or reconfiguration of the hardware component.

In Example 30, the subject matter of anyone or more of Examples 21-29 optionally include subject matter where the original entity is an original component manufacturer, and wherein the subsequent entity is one of a: original equipment manufacturer, reseller, value added reseller, owner, or platform.

Example 31 is an apparatus, comprising: means for accessing an embedded voucher associated with a hardware component, wherein the embedded voucher includes an identifier for the hardware component and the identifier is generated on behalf of an original entity authorized to issue the identifier; means for accessing a voucher, wherein the voucher includes a second identifier that is provided on behalf of a subsequent entity and the second identifier is generated based on the identifier for the hardware component included in the embedded voucher, wherein the voucher identifies ownership rights in the hardware component for both of the original entity and the subsequent entity; means for performing an action with the apparatus, based on validation of the voucher.

In Example 32, the subject matter of Example 31 optionally includes means for storing the embedded voucher, wherein the embedded voucher is stored as unmodifiable.

In Example 33, the subject matter of anyone or more of Examples 31-32 optionally include means for generating the identifier based on a composite device identifier used within a Device Identifier Composition Engine (DICE) architecture.

In Example 34, the subject matter of Example 33 optionally includes means for generating the second identifier based on a second composite device identifier within the DICE architecture, wherein the composite device identifier is assigned to the original entity in the embedded voucher, and wherein the second composite device identifier is assigned to the subsequent entity in the voucher.

In Example 35, the subject matter of any one or more of Examples 33-34 optionally include means for generating the second identifier based on multiple hardware layers in the DICE architecture.

In Example 36, the subject matter of anyone or more of Examples 31-35 optionally include means for generating the voucher to identify the original entity as a partial owner of the hardware component and to identify the subsequent entity as a partial owner of the hardware component.

In Example 37, the subject matter of anyone or more of Examples 31-36 optionally include means for identifying information for the embedded voucher and the voucher to indicate: a certificate authority associated with an issuer of the respective voucher, and a certificate authority associated with an assignment of ownership in the respective voucher.

In Example 38, the subject matter of anyone or more of Examples 31-37 optionally include means for attempting the validation of the voucher, to validate ownership rights for the original entity or the subsequent entity; wherein the action is performed with the hardware component based on successful validation of the voucher.

In Example 39, the subject matter of Example 38 optionally includes subject matter where the action is one of: onboarding, updating, retooling, or reconfiguration of the hardware component.

In Example 40, the subject matter of anyone or more of Examples 31-39 optionally include subject matter where the original entity is an original component manufacturer, and wherein the subsequent entity is one of a: original equipment manufacturer, reseller, value added reseller, owner, or platform.

Another example implementation is an IoT, ICN, or edge computing system, including respective edge processing devices and nodes that include, invoke, or perform the features of Examples 1-40, or other subject matter described herein.

Another example implementation is an aggregation node, network hub node, gateway node, or core data processing node, within or coupled to an IoT, ICN, or edge computing system, that include, invoke, or perform the features of Examples 1-40, or other subject matter described herein.

Another example implementation is an access point, base station, road-side unit, street-side unit, or on-premise unit, within or coupled to an IoT, ICN, or edge computing system, that include, invoke, or perform the features of Examples 1-40, or other subject matter described herein.

Another example implementation is an IoT, ICN, or edge computing system including aspects of network functions, acceleration functions, acceleration hardware, storage hardware, or computation hardware resources, that include, invoke, or perform the features of Examples 1-40, or other subject matter described herein.

Another example implementation is an IoT, ICN, or edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, that include, invoke, or perform the features of Examples 1-40, or other subject matter described herein.

Another example implementation is an apparatus of an IoT, ICN, or edge computing system comprising: one or more processors and one or more computer-readable media comprising instructions that, when executed by the one or more processors, cause the one or more processors to invoke or perform the use cases discussed herein, with features of Examples 1-40, or other subject matter described herein.

Another example implementation is one or more computer-readable storage media comprising instructions to cause an electronic device of an IoT, ICN, or edge computing system, upon execution of the instructions by one or more processors of the electronic device, to invoke or perform the use cases discussed herein, with features of Examples 1-40, or other subject matter described herein.

Another example implementation is an apparatus of an IoT, ICN, or edge computing system comprising means, logic, modules, or circuitry to invoke or perform the use cases discussed herein, with features of Examples 1-40, or other subject matter described herein.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing device, comprising:
   a hardware component;
   trusted hardware circuitry, wherein the trusted hardware circuitry is separate from the hardware component, wherein the trusted hardware circuitry is configured to provide a hardware root of trust that securely stores trusted data including an embedded voucher associated with the hardware component, wherein the embedded voucher stored in the hardware root of trust includes an identifier for the hardware component and the identifier is generated on behalf of an original entity authorized to issue the identifier, and wherein the embedded voucher is unmodifiable in the hardware root of trust; and storage memory, configured to store a voucher for validation of the hardware component, wherein the voucher includes a second identifier that is provided on behalf of a subsequent entity and the second identifier is generated based on the identifier for the hardware component included in the embedded voucher;

wherein the voucher identifies ownership rights in the hardware component for both of the original entity and the subsequent entity;

wherein the original entity is an original component manufacturer, and the subsequent entity is one of a: original equipment manufacturer, reseller, value added reseller, owner, or platform; and wherein the computing device is configured to perform validation of the voucher, and wherein upon successful validation of the voucher, the computing device is to:
validate ownership rights for the original entity or the subsequent entity; and
perform an action with the hardware component.

2. The computing device of claim 1, wherein the identifier is based on a composite device identifier provided within a Device Identifier Composition Engine (DICE) architecture.

3. The computing device of claim 2, wherein the second identifier is based on a second composite device identifier, wherein the composite device identifier is assigned to the original entity in the embedded voucher, and wherein the second composite device identifier is assigned to the subsequent entity in the voucher.

4. The computing device of claim 2, wherein the second identifier is generated based on multiple hardware layers in the DICE architecture.

5. The computing device of claim 1, wherein the voucher identifies the original entity as a partial owner of the hardware component, and identifies the subsequent entity as a partial owner of the hardware component.

6. The computing device of claim 1, wherein the embedded voucher and the voucher include information that indicates: a certificate authority associated with an issuer of the respective voucher, and a certificate authority associated with an assignment of ownership in the respective voucher.

7. The computing device of claim 1, wherein the action is one of:
onboarding, updating, retooling, or reconfiguration of the hardware component.

8. At least one non-transitory machine-readable storage medium comprising instructions stored thereupon, which when executed by processing circuitry of a computing system, cause the processing circuitry to perform operations comprising:

accessing an embedded voucher from a trusted hardware circuitry of the computing system, the embedded voucher associated with a hardware component of the computing system, wherein the trusted hardware circuitry provides a hardware root of trust to store trusted data including the embedded voucher, wherein the trusted hardware circuitry is separate from the hardware component, wherein the embedded voucher includes an identifier for the hardware component and the identifier is generated on behalf of an original entity authorized to issue the identifier, and wherein the embedded voucher is unmodifiable in the hardware root of trust;

accessing a voucher from a storage memory of the computing system, wherein the voucher includes a second identifier that is provided on behalf of a subsequent entity and the second identifier is generated based on the identifier for the hardware component included in the embedded voucher, and wherein the voucher identifies ownership rights in the hardware component for both of the original entity and the subsequent entity;

performing validation of the voucher, in order to validate ownership rights for the original entity or the subsequent entity; and performing an action with the hardware component, upon successful validation of the voucher;

wherein the original entity is an original component manufacturer, and the subsequent entity is one of a: original equipment manufacturer, reseller, value added reseller, owner, or platform.

9. The machine-readable storage medium of claim 8, wherein the identifier is based on a composite device identifier provided within a Device Identifier Composition Engine (DICE) architecture.

10. The machine-readable storage medium of claim 9, wherein the second identifier is based on a second composite device identifier, wherein the composite device identifier is assigned to the original entity in the embedded voucher, and wherein the second composite device identifier is assigned to the subsequent entity in the voucher.

11. The machine-readable storage medium of claim 9, wherein the second identifier is generated based on multiple hardware layers in the DICE architecture.

12. The machine-readable storage medium of claim 8, wherein the voucher identifies the original entity as a partial owner of the hardware component, and identifies the subsequent entity as a partial owner of the hardware component.

13. The machine-readable storage medium of claim 8, wherein the embedded voucher and the voucher include information that indicates: a certificate authority associated with an issuer of the respective voucher, and a certificate authority associated with an assignment of ownership in the respective voucher.

14. The machine-readable storage medium of claim 8, wherein the action is one of: onboarding, updating, retooling, or reconfiguration of the hardware component.

15. A method, performed in a computing device, of using a voucher to attest ownership of a hardware component of the computing device, the method comprising:

accessing an embedded voucher from a trusted hardware circuitry of the computing device, the embedded voucher associated with the hardware component of the computing device, wherein the trusted hardware circuitry provides a hardware root of trust to store trusted data including the embedded voucher, wherein the trusted hardware circuitry is separate from the hardware component, wherein the embedded voucher includes an identifier for the hardware component and the identifier is generated on behalf of an original entity authorized to issue the identifier, and wherein the embedded voucher is unmodifiable in the hardware root of trust;

accessing a voucher from a storage memory of the computing device, wherein the voucher includes a second identifier that is provided on behalf of a subsequent entity and the second identifier is generated based on the identifier for the hardware component included in the embedded voucher, and wherein the voucher identifies ownership rights in the hardware component for both of the original entity and the subsequent entity;

performing validation of the voucher, in order to validate ownership rights for the original entity or the subsequent entity; and performing an action with the hardware component, upon successful validation of the voucher;

wherein the original entity is an original component manufacturer, and the subsequent entity is one of a: original equipment manufacturer, reseller, value added reseller, owner, or platform.

16. The method of claim 15, wherein the identifier is based on a composite device identifier provided within a Device Identifier Composition Engine (DICE) architecture.

17. The method of claim 15, wherein the voucher identifies the original entity as a partial owner of the hardware component, and identifies the subsequent entity as a partial owner of the hardware component.

18. The method of claim 15,
wherein the action is one of: onboarding, updating, retooling, or reconfiguration of the hardware component.

* * * * *